United States Patent [19]

Osman et al.

[11] 4,299,720
[45] Nov. 10, 1981

[54] LIQUID CRYSTAL MIXTURE

[75] Inventors: Maged A. Osman, Zurich; Terry J. Scheffer, Forch; László Révész, Fislisbach; Jürgen Markert, Ettingen, all of Switzerland

[73] Assignee: BBC Brown, Boveri & Co., Ltd., Baden, Switzerland

[21] Appl. No.: 92,961

[22] Filed: Nov. 9, 1979

[30] Foreign Application Priority Data

Dec. 21, 1978 [CH] Switzerland ............... 12993/78

[51] Int. Cl.³ ..................... C09K 3/34; G02F 1/13
[52] U.S. Cl. ..................... 252/299.1; 252/408; 350/349; 350/350 R
[58] Field of Search ............. 252/299, 408, 299.1; 350/350 R, 349

[56] References Cited

U.S. PATENT DOCUMENTS

| | | | |
|---|---|---|---|
| 3,833,287 | 9/1974 | Taylor et al. | 252/299 |
| 4,137,193 | 1/1979 | Osman et al. | 252/299 |
| 4,141,627 | 2/1979 | Bloom | 252/299 |
| 4,145,114 | 3/1979 | Coates et al. | 252/299 |
| 4,153,343 | 5/1979 | Bloom et al. | 252/299 |
| 4,232,949 | 11/1980 | Huffman | 252/299.1 |
| 4,232,950 | 11/1980 | Bemham | 252/299.1 |

FOREIGN PATENT DOCUMENTS

| | | | |
|---|---|---|---|
| 2104 | 5/1979 | European Pat. Off. | 252/299 |
| 2658568 | 7/1977 | Fed. Rep. of Germany | 252/299 |
| 2639675 | 2/1978 | Fed. Rep. of Germany | 252/299 |
| 2815335 | 10/1978 | Fed. Rep. of Germany | 252/299 |
| 2037803 | 7/1980 | United Kingdom | 252/299.1 |

OTHER PUBLICATIONS

Constant, J., et al., "Photostable Anthraquinone Pleochroic Dyes," Presented at 7th International, L. C. Cone, Bordeaux, France, (Aug. 1978).
White, D. L., et al., J. Appl. Phys., vol. 45, No. 11, pp. 4718-4723, (1974).
Cox, R. J., Mol. Cryst. Liq. Cryst., vol. 55, pp 1-32, (1979).

Primary Examiner—Teddy S. Gron
Attorney, Agent, or Firm—Oblon, Fisher, Spivak, McClelland & Maier

[57] ABSTRACT

A liquid crystal mixture intended for electrooptical displays having no polarizers, consisting of:
a nematic liquid crystal as the host phase;
an optically active additive to give the host phase a cholesteric structure; and
at least one pleochroic anthraquinone dye as the guest phase dissolved in the host phase, said anthraquinone dye having the formula:

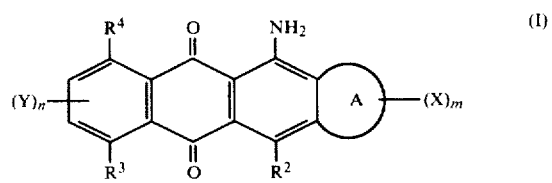

wherein $R^2$, $R^3$ and $R^4$ are the same or different substituents and are selected from the group consisting of hydrogen, hydroxyl, amino, and short-chain N-monoalkylamino substituents; Y represents halogen, alkyl or alkoxy groups each with 1-16 carbon atoms, amino, alkylamino groups with 1-16 carbon atoms in the alkyl portion, nitro, or hydroxyl group; X represents halogen, amino or the group $R^5$, wherein $R^5$ is an alkyl group with 1-18 carbon atoms, an alkyl chain with 1-18 carbon atoms that is interrupted with one or two oxy groups or a group having the formula:

$$-(CH_2)_p-(O-C_2H_4)_r-O-R^6$$

wherein p is an integer from 1 to 6, r is either zero or an integer from 1 to 6, and $R^6$ is an alkyl group with 1-6 carbon atoms; the symbol A represents a 5- or 6-membered aromatic, alicyclic or heterocyclic ring which may be substituted with oxo- and/or imino groups, or optionally, hydroxy and/or amino groups and indices n and m can be 0, 1 or 2.

12 Claims, No Drawings

LIQUID CRYSTAL MIXTURE

The invention concerns liquid crystal (LC) mixtures that are intended for application in electrooptic display cells that have no polarizers.

In display cells with a liquid crystalline dielectric phase, it is known that an electrooptical effect is produced through the embedding of dichroic or pleochroic dyes as the so-called "guest phase" in a liquid crystalline matrix as the so-called "host phase" (see G. H. Heilmeier, et al., Molec. Cryst. Liq. Cryst. 8, 293-304 (1969)). The dye molecules of the guest phase are dissolved in the host phase and oriented by the application of an electric field. Because of their pleochroic properties, these dyes show a different amount of light absorption depending upon their orientation. In contrast to ordinary monochroic dyes, the amount of light absorbed by pleochroic dyes depends upon the orientation of their molecules with respect to the electric field vector of the incident light. By application of an electric field to the LC mixture, distributed as a thin layer in a cell, the nematic liquid crystal of the host phase together with the embedded pleochroic dyes of the guest phase are reoriented, leading to a change in the amount of light absorbed. The practical application of this effect, known by the experts in the field as the "guest-host" effect, is described, for example, in the German Pat. No. 1,928,003. Indophenol blue, indigo derivatives, and azo dyes, among others, are described in this patent as examples of pleochroic or dichroic dyes. The display brightness and contrast ratios that can be obtained with these dyes, however, are relatively weak in comparison with those that can be obtained with the well-known twisted nematic liquid crystal display devices, in addition to requiring a polarizer.

According to a recent development described, for example, in the German Pat. No. 2,410,557, the polarizers can be eliminated if a relatively small amount of optically active material (e.g. 1-15% by weight) is added to the dielectric phase of the display which consists of nematic liquid crystals with positive dielectric ansiotropy (host phase) and embedded pleochroic dyes (guest phase). This optically active material, also known as an optically active dopant, gives the bulk liquid crystal phase a twisted internal structure which is known as a "chiral" or "cholesteric" structure and is described, for example, in the publication by D. L. White and G. N. Taylor entitled "New Absorptive Mode Reflective Liquid Crystal Display Device" in J. Appl. Phys. 45, 4718-4723 (1974). An example of the construction and operation of a display cell employing this principle is described in the German Pat. No. 2,639,675 and 2,658,568.

Liquid crystal display cells having a host phase with a cholesteric structure and an embedded dye as the guest phase have come to be known among experts as "cholesteric guest-host" (CGH) liquid crystal display cells. Such display cells have the advantages of being suitable for commercial manufacture, requiring no polarizers and making possible an adequate display contrast ratio with a simpler cell technology.

Experience has shown that the choice of suitable dyes for "cholesteric guest-host" cells is very difficult. First of all, the dichroic ratio of such a host phase embedded with dye as the guest phase must be large enough to give the display cell a sufficient brightness and a sufficient contrast ratio. The pleochroic or dichroic ratio of the system is defined as the ratio $a_1/a_2$ of the absorbance (optical density) $a_1$ of the dye measured when the molecular orientation or optic axis of the nematic host phase with the embedded dye as the guest phase is parallel to the E-vector of the incident light to the absorbance $a_2$ measured when the molecular orientation is perpendicular to the E-vector of the incident light. The values of $a_1$ and $a_2$ can be measured by well-known photometric techniques described, for example, in the publication by White and Taylor mentioned earlier. Generally the $a_1/a_2$ value should be at least 5 in order to guarantee that the display will have a sufficient brightness and contrast ratio.

In addition to the dichroic ratio $a_1/a_2$, other parameters of the dye are also important for their application in cholesteric guest-host displays. The dye must have an absorption maximum in the visible region of the electromagnetic spectrum, i.e. between 400 and 700 nm, and the dye must be stable in the host phase up to 100° C. (a) against the application of a.c. voltage up to 20 v, (b) against light, especially the UV light present in natural daylight, and (c) against the other components of the doped host mixture.

The dyes previously proposed for the cholesteric guest-host effect do not adequately fulfill all these requirements. As a particular example, the azo dyes which are frequently proposed for cholesteric guest-host liquid crystal cells have suitable $a_1/a_2$ values and absorption maximae, but insufficient stability against light, especially ultra-violet light (too low a photochemical stability). Many of the azo dyes have also been found to be chemically labile. On the other hand, the generally higher photochemical stability of the anthraquinone dyes with the basic structure (40)

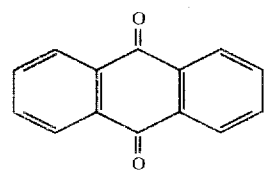

in comparison with the azo dyes is well-known, and in fact anthraquinone dyes have actually been proposed in the scientific literature for application in cholesteric guest-host liquid crystal display cells. However, the majority of the anthraquinone dyes suggested up to now have too low an $a_1/a_2$ value, i.e. too small a dichroic ratio, to permit a low operating voltage of 3 to 4.5 volts to be used on the display. Various substituted anthraquinone dyes having the structures (41) and (42) were investigated by J. Constant, et al in a paper entitled "Photostable Anthraquinone Pleochroic Dyes" presented at the 7th International Liquid Crystal Conference in 1978:

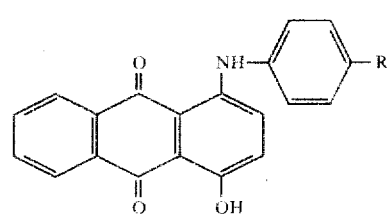

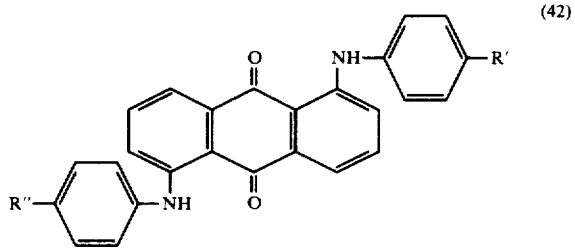

(42)

The symbols R, R', and R" represent alkyl and alkyloxy groups with up to 9 carbon atoms in the alkyl part, or a dimethylamino group. The dichroic ratios of these dyes, in a commercially available nematic phase (product Ro-TN-403 from Hoffmann-La Roche, a mixture of biphenyl and phenyl-pyrimidine compounds), fall in the range from 5.6 to 7.0, which seems to confirm the suitability of phenylamino groups in the modifications of the anthraquinone dyes that are of interest here. However the phenylamino group also lowers the solubility of the dye in the nematic host phase, but this can be compensated for by introducing longer alkyl or alkoxy chains as R, R', and R". Because such chains are flexible, they have practically no effect upon the value of the dichroic ratio.

The goal of this invention is to devise modified anthraquinone dyes for cholesteric guest-host liquid crystal display cells that possess a high dichroic ratio $a_1/a_2$, preferably lying over 7, and have an adequate solubility in the doped host phase of the dielectric of the cell, preferably at least 0.5% by weight. It was found that this goal could be achieved through the utilization of modified anthrquinone dyes having the general formula (1) shown below. Some of the dyes having this general formula are known and available as such or are analogs of known compounds which are available.

The subject of this invention is a liquid crystal mixture intended for cholesteric guest-host liquid crystal displays of which essentially 80–100% consists of (a) a nematic liquid crystal with positive or negative dielectric anisotropy as the host phase, (b) an optically active additive to give the host phase a cholesteric structure, e.g. having a concentration of 0.5 to 15% by weight of the total mixture, and (c) at least one dissolved pleochroic anthraquinone dye which can either be alone or mixed with other UV stable dyes, preferably in concentrations from 0.1 to 5% by weight of the total mixture.

A distinguishing feature of the LC mixture of this invention is that at least some of the dissolved anthraquinone dyes have the general formula (1)

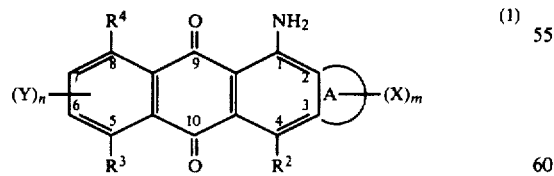

(1)

where $R^2$, $R^3$, and $R^4$ are the same or different substituents from the group consisting of hydrogen, hydroxyl, amino and short-chain N-monoalkylamino substituents. The term short-chain in this context means alkyl groups with 1 or 2 carbon atoms. In a preferred embodiment of this invention at least one of the $R^2$, $R^3$, and $R^4$ groups is an amino group.

The symbol Y represents one or two optional substituents in the 6 or 7 position of the anthraquinone skeleton. These substituents can be halogen atoms (preferably bromine and/or chlorine), alkyl or alkoxy groups with 1-16 carbon atoms in the alkyl part which is preferably a straight chain, amino groups, $C_1$-$C_{16}$ alkylamino groups, nitro groups, or hydroxyl groups.

The ring "A" condensed onto the anthraquinone structure of formula (1) at the 2 and 3 positions has, including the two carbon atoms at positions 2 and 3, a total of 5 or 6 atoms forming the ring in an aromatic, alicyclic or heterocyclic conformation. The complete ring is therefore always formed with at least two carbon atoms and at most 6 carbon atoms and, as the case may be, one or several heteroatom(s), such as nitrogen, sulfur, oxygen, etc..

The symbol X in formula (1) represents a halogen atom, an amino group, or the group $R^5$ which is either an alkyl group with 1-18 carbon atoms or, as the case may be, an alkyl chain with 1-18 carbon atoms that is interrupted with one or two oxy groups, i.e. having a general formula $-(CH_2)_p-(OC_2H_4)_r-O-R^6$ where p is an integer from 1-6, r is zero or an integer from 1-6 and $R^6$ represents an alkyl group with 1-6 carbon atoms.

The indices n and m in formula (1) can be the same or different and can be 0, 1 and 2.

The atoms forming the ring A which are not involved in the fusion to the anthraquinone skeleton can carry, as far as their valancy permits, in addition to X also oxo- and/or imino groups or hydroxyl or amino groups.

Generally preferred embodiments for heterocyclic rings A are pyrrols, pyrrolidines, imidazoles, imidazolines, oxazoles, oxazolidines, thiazoles, thiazolidines, etc. as well as the corresponding keto and/or imino substituted forms. Other hetero-atoms, like P or Se, are possible, but are not especially preferred.

Examples of the structures of preferred forms of the ring A in formula (1) are given below, where for simplicity only the 1,2 and 3,4 bonds of the anthraquinone skeleton are shown. $R^5$ has the same meaning as was previously given, and $R^7$ stands for hydrogen, or a short-chain alkyl group. $R^5$ is preferably an alkyl or alkyloxyalkyl group with a total of 2-14 carbon atoms.

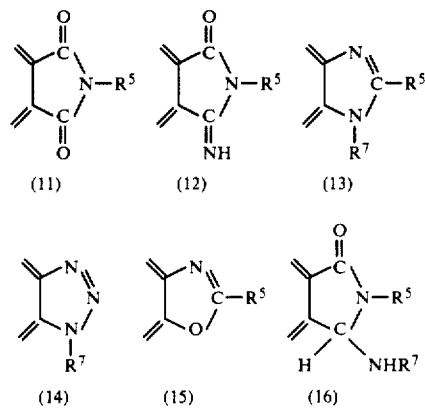

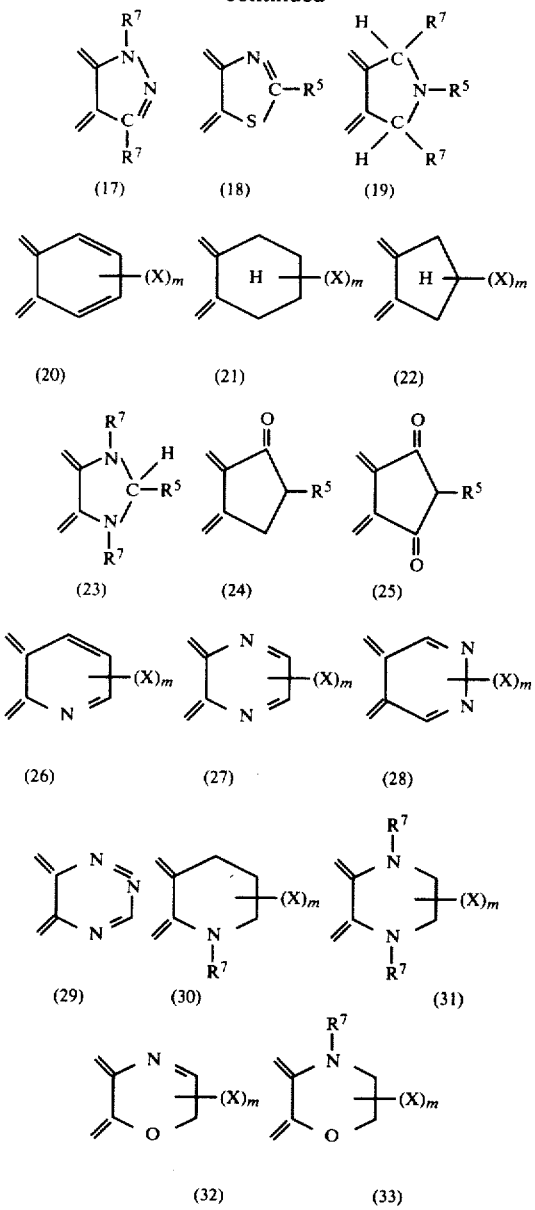

Some of the dyes having the general formula (1) are already known (see, for example, the German Pat. No. 1,769,470) or can be manufactured by well-known processes, for example from corresponding anthraquinone compounds which have substituents in the 2 and 3 positions suitable for forming a ring using conventional ring cyclization methods. The desired substituents on the anthraquinone skeleton $R^2$, $R^3$, $R^4$, and Y can be introduced either before or after the ring cyclization step. The substituents on the ring A can be introduced during the cyclization process itself or added on after this process.

The mixtures of this invention can be produced in the visual way by mixing the components (a), (b) and (c) together and, if necessary, gently warming. Suitable display cells, for example, having a structure described in the German Pat. No. 2,639,675 are then filled with the mixture.

Suitable components (a) and (b), as mentioned earlier, are well-known and many are commercially available. Examples of component (a) are, besides the product "Ro-TN-403" already mentioned, the product "Ro-TN-103", "Merck ZLI 1221", and "Merck 1291". Additional examples for suitable components (a) as well as (b) can be found in the publication by White and Taylor mentioned earlier as well as in the German Pat. Nos. 2,410,557 and 2,658,568. An example for component (b) that is commercially available is the substance "CB 15" having the formula

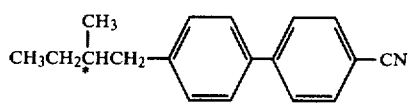

which can be obtained from the British Drug House, Ltd. *

* Examples of component (a) with negative dielectric amisotrophy are the products "Merck Licristal 887 or "Chissolixon EN-18".

EXAMPLES 1-18

Anthraquinone dyes having the general formula (34)–(37) where $R^5$ represents:

$R^5 = -(CH_2)_3OCH_3$ in formula 34 giving formula 340

$R^5 = -(CH_2)_3OCH_3$ in formula 35 giving formula 350

$R^5 = -(CH_2)_3OCH_3$ in formula 36 giving formula 360

$R^5 = -(CH_2)_3CH_3$ in formula 34 giving formula 349

$R^5 = -(CH_2)_5CH_3$ in formula 37 giving formula 370

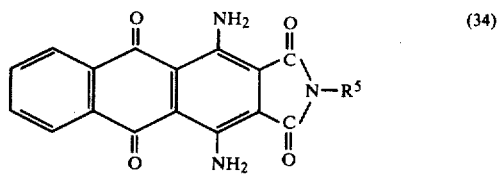

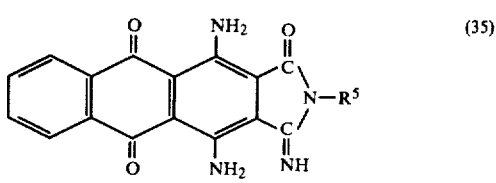

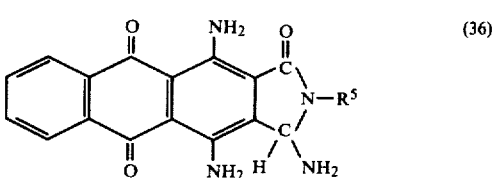

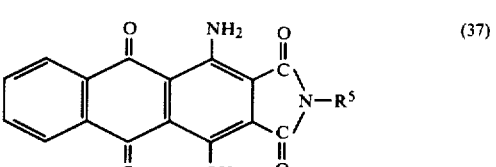

as components (c) were mixed together with commecially available nematic mixtures (having positive dielectric ansiotropy) as component (a) and the commercially available product CB 15 as component (b).

The dichroic ratios of these dyes in the nematic mixture "Ro-TN-403" are summarized in Table I.

TABLE I

| Dye formula No. | Dichroic ratio |
|---|---|
| 340 | 8.6 |
| 350 | 8.9 |
| 360 | 8.6 |
| 349 | 8.6 |
| 370 | 7.9 |

The compositions of the resulting liquid crystal mixtures are summarized in Table II.

The daylight UV tests of the liquid crystal mixtures of the above examples 1–18 have shown that they are completely stable. The stability against a.c. voltages is also very good.

TABLE II

| Example No. | (a) Nematic phase (Wt. %) | (b) CB 15 (Wt. %) | (c) Dye (Formula No. and Wt. %) | | $T_c$ (°C.) |
|---|---|---|---|---|---|
| 1 | Ro-TN 403 | 96.5 | 3 | (340) 0.5 | 78 |
| 2 | " | 95.5 | 4 | " 0.5 | 76.8 |
| 3 | " | 94.5 | 5 | " 0.5 | 75.8 |
| 4 | " | 96.5 | 3 | (350) 0.5 | 78.3 |
| 5 | " | 95.5 | 4 | " 0.5 | 77.1 |
| 6 | " | 94.5 | 5 | " 0.5 | 76.1 |
| 7 | " | 96 | 3 | (360) 0.5 | 78.2 |
| 8 | " | 95 | 4 | " 0.5 | 77.0 |
| 9 | " | 94 | 5 | " 0.5 | 76.0 |
| 10 | " | 96.5 | 3 | (349) 0.5 | 78.6 |
| 11 | " | 95.5 | 4 | " 0.5 | 77.4 |
| 12 | " | 94.5 | 5 | " 0.5 | 76.4 |
| 13 | " | 96.5 | 3 | (370) 0.5 | 78.5 |
| 14 | " | 95.5 | 4 | " 0.5 | 77.3 |
| 15 | " | 94.5 | 5 | " 0.5 | 76.3 |
| 16 | " | 96 | 3 | " 1 | 78.7 |
| 17 | " | 95 | 4 | " 1 | 77.5 |
| 18 | " | 94 | 5 | " 1 | 76.5 |

EXAMPLES 19–46

Practically the same results as in Examples 1–18 are obtained when, instead of dyes having the formulae 340, 349, 350, 360, and 370, dyes having the formulae 341–347, 351–357, 361–367, and 371–377 are utilized. These dyes are defined as follows:

| Example No. | Basic formula $R^5$ represents | 34 | 35 | 36 | 37 |
|---|---|---|---|---|---|
| | | | Formula No. | | |
| 19–22 | -n-$C_4H_9$ | 341 | 351 | 361 | 371 |
| 23–26 | -n-$C_8H_{17}$ | 342 | 352 | 362 | 372 |
| 27–30 | -i-$C_9H_{19}$ | 343 | 353 | 363 | 373 |
| 31–34 | -i-$C_{13}H_{27}$ | 344 | 354 | 364 | 374 |
| 35–38 | —$CH_2CH(CH_2)_3CH_3$ <br> \| <br> $C_2H_5$ | 345 | 355 | 365 | 375 |
| 39–42 | —$(CH_2)_3OCH_2CH(CH_2)_3CH_3$ <br> \| <br> $CH_3$ | 346 | 356 | 366 | 376 |
| 43–46 | -n-$C_6H_{13}$ | 347 | 357 | 367 | 377 |

All of these dyes possess dichroic ratios of over 7 and are stable in liquid crystal mixtures against UV light and a.c. voltages as well as chemically stable against the other components of the liquid crystal mixture.

EXAMPLES 47–49

Further liquid crystal mixtures are prepared with the dye components mentioned in Examples 1–18. The components (a) and (b) listed in Table II are mixed together in the given concentrations together with the dye component (c), also in the specified concentration. For these examples the dye component (c) is a mixture of two or three of the special dyes having the general formulae 34–37 in equal amounts.

Example 47: Component (c) is a 1:1 by weight mixture of the dyes having the formulae 345 and 347.

Example 48: Component (c) is a 1:1:1 by weight mixture of the dyes having the formulae 342, 345, and 347.

Example 49: Component (c) is a 1:1 by weight mixture of the dyes having the formulae 342 and 346.

We claim:

1. Liquid crystal mixture intended for electro-optical displays having no polarizers, consisting of:
   a nematic liquid crystal as the host phase;
   an optically active additive to give the host phase a cholesteric structure; and
   at least one pleochroic anthraquinone dye as the guest phase dissolved in the host phase, said anthraquinone dye having the formula:

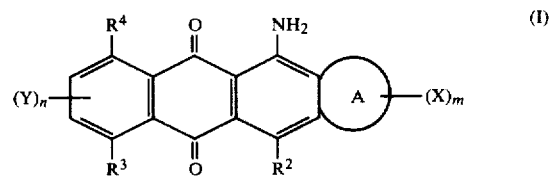

wherein $R^2$, $R^3$ and $R^4$ are the same or different substituents and are selected from the group consisting of hydrogen, hydroxyl, amino, and short-chain N-monoalkylamine substituents; Y represents halogen, alkyl or alkoxy groups each with 1–16 carbon atoms, amino, alkylamino groups with 1–16 carbon atoms in the alkyl portion, nitro, or hydroxyl groups; X represents halogen, amino or the group $R^5$, wherein $R^5$ is an alkyl group with 1–18 carbon atoms, an alkyl chain with 1–18 carbon atoms that is interrupted with one or two oxy groups or a group having the formula:

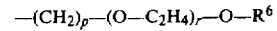

wherein p is an integer from 1 to 6, r is either zero or an integer from 1 to 6, and $R^6$ is an alkyl group with 1–6 carbon atoms; the symbol A represents a 5 or 6 membered aromatic, alicyclic or heterocyclic ring which may be substituted with oxo and/or imino groups or, optionally, hydroxy and/or amino groups and indices n and m can be 0, 1 or 2.

2. The mixture of claim 1, wherein $R^5$, X and m have the same meaning as recited and $R^7$ represents hydrogen or a short chain alkyl group, wherein ring A corresponds to a ring having the formulae (11)–(33)

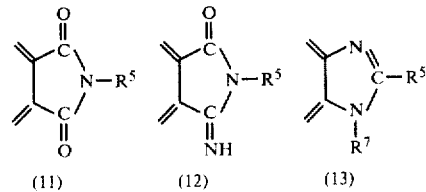

-continued

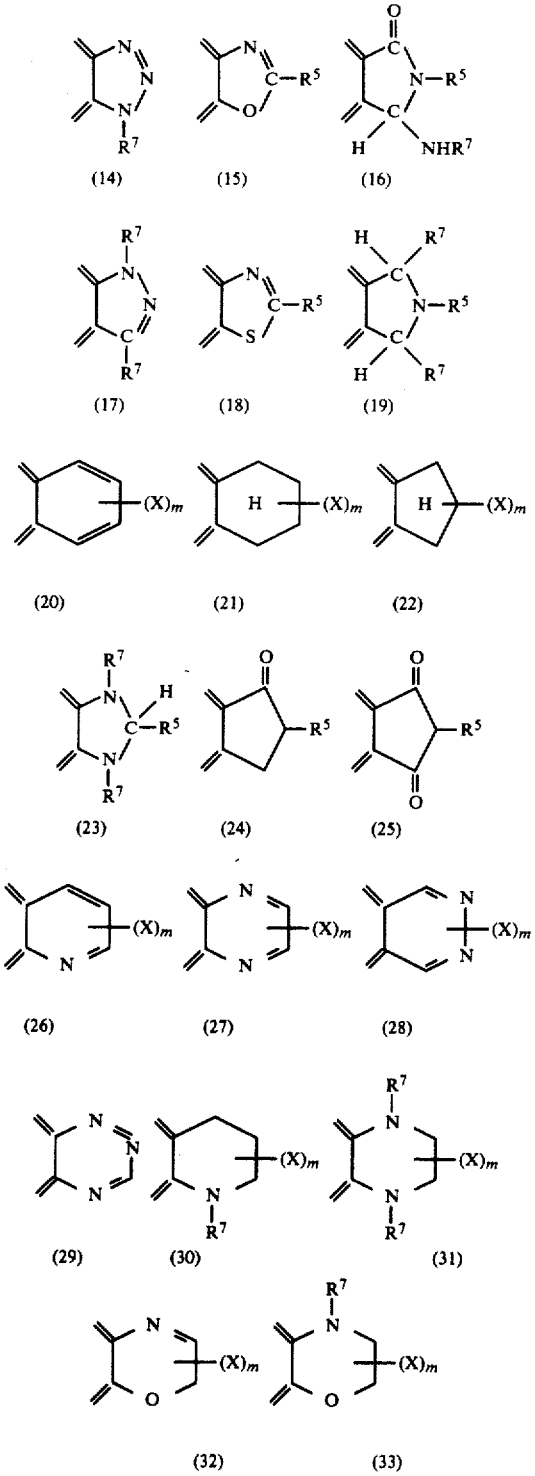

3. The mixture of claim 2, wherein ring A is selected from the group consisting of rings of the formula (11)–(19) and R⁷ represents hydrogen.

4. The mixture of claim 1, wherein $R^3$ is hydrogen or amino, $R^4$ is hydrogen, $n=0$, $m=1$, X has the same meaning as defined in claim 1 and $R^2$ is hydrogen, amino, or hydroxyl.

5. The mixture of claim 4, wherein $R^5$ is an alkyl group with 2-14 carbon atoms, or an alkyloxyalkyl group having a total of 2-14 carbon atoms.

6. The mixture of claim 1, 2, 3, 4 or 5, wherein the anthraquinone dye of formula (1) has a dichroic ratio of at least 7.

7. The mixture of claim 1, wherein dye (1) has the formula (34).

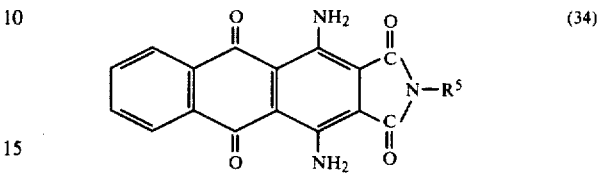

and $R^5$ is as defined in claim 1.

8. The mixture of claim 1, wherein dye (1) has the formula (35)

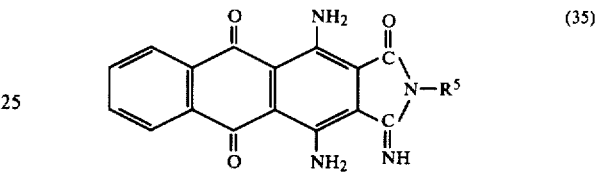

and $R^5$ is as defined in claim 1.

9. The mixture of claim 1, wherein dye (1) has the formula (36)

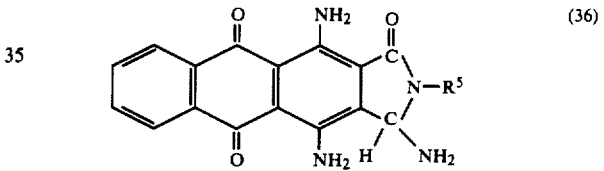

and $R^5$ is as defined in claim 1.

10. The mixture of claim 1, wherein dye (1) has the formula (37)

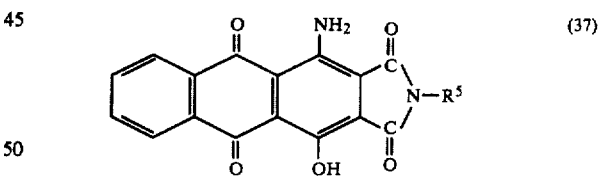

and $R^5$ is defined in claim 1.

11. The mixture of claim 7, 8, 9 or 10 wherein $R^5$ represents a straight or branched chain alkyl group with 2-14 carbon atoms, —(CH₂)₃OCH₃, or
—(CH₂)₃OCH₂CH(CH₃)(CH₂)₃CH₃.

12. The mixture of claim 1, wherein the mixture is composed of
80–98.5 wt. % host phase
0.5–15 wt. % optically active additive
0.1–5 wt. % anthraquinone dye
and wherein the solubility of the anthraquinone dye in the host phase at normal temperatures is at least 0.5 wt. %.

* * * * *